UNITED STATES PATENT OFFICE.

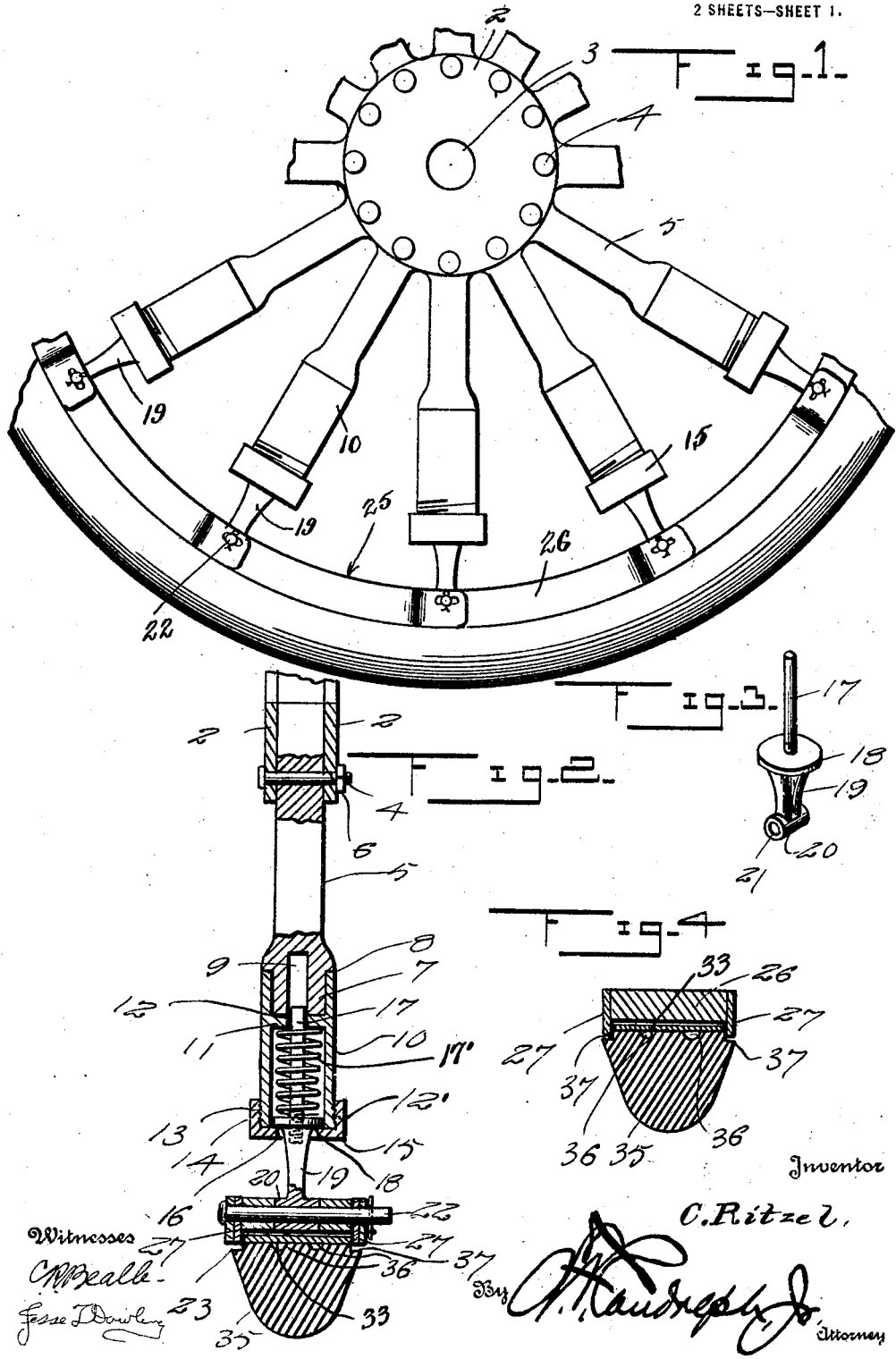
C. RITZEL.
AUTOMOBILE WHEEL.
APPLICATION FILED AUG. 4, 1917.
1,388,061.
Patented Aug. 16, 1921.
2 SHEETS—SHEET 1.

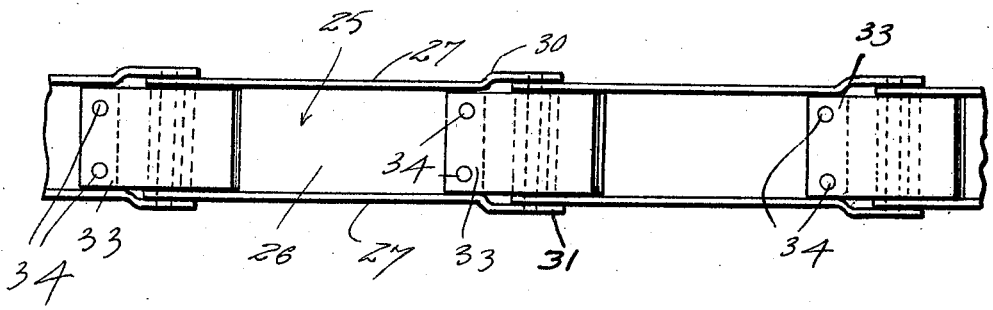
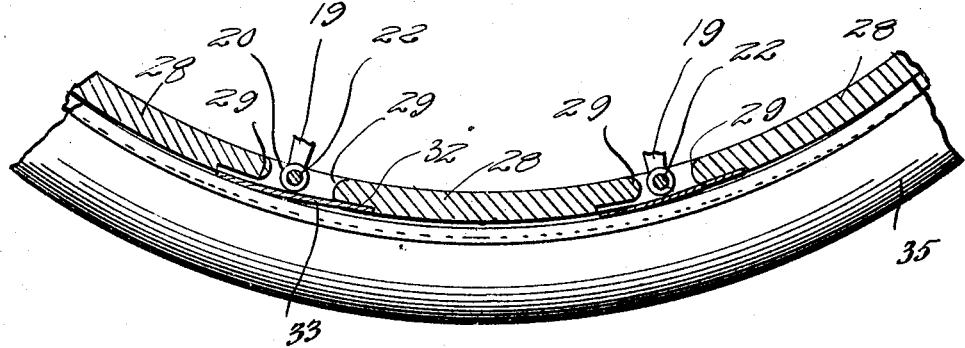
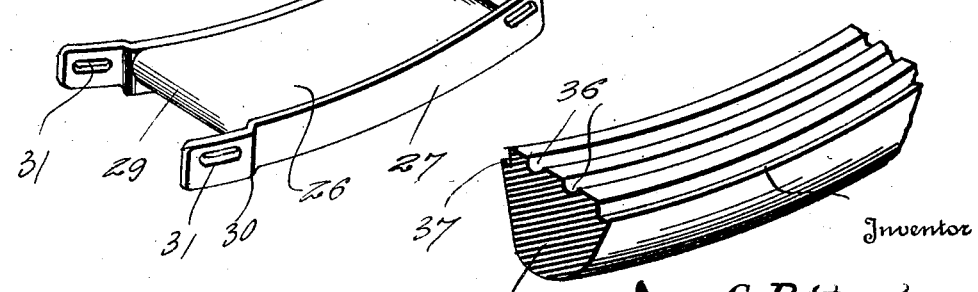

CONRAD RITZEL, OF DAYTON, OHIO, ASSIGNOR OF ONE-HALF TO JULIAN J. TANGEMAN, OF DAYTON, OHIO.

AUTOMOBILE-WHEEL.

1,388,061.   Specification of Letters Patent.   Patented Aug. 16, 1921.

Application filed August 4, 1917. Serial No. 184,499.

*To all whom it may concern:*

Be it known that I, CONRAD RITZEL, a citizen of the United States, residing at Dayton, in the county of Montgomery and State of Ohio, have invented certain new and useful Improvements in Automobile-Wheels; and I do hereby declare the following to be a full, clear, and exact description of the invention, such as will enable others skilled in the art to which it appertains to make and use the same.

My invention relates to improvements in vehicle wheels having means for using solid tires without detracting from the resiliency of a pneumatic tire.

An important object of this invention is to provide a wheel of the character described, wherein a plurality of rim sections are pivotally secured to plungers adapted to partake of a reciprocatory movement within cylinders carried by the outer ends of the spokes.

A further object of the invention is to provide a wheel of the character described, wherein a plurality of spokes radiate from the hub and are provided in their outer ends with cylinders, said cylinders being adapted to receive reciprocatory pistons having pivotal connection with a plurality of rim sections, thereby permitting of the wheel to flex radially and circumferentially.

A further object of the invention is to provide a wheel of the character described, which is simple, practical and comparatively cheap to manufacture.

Other objects and advantages of the invention will be apparent during the course of the following description.

In the accompanying drawings forming a part of this specification, and in which like numerals are employed to designate like parts throughout the same,—

Figure 1 is a side elevation of a fragment of a wheel embodied in my invention.

Fig. 2 is a vertical transverse section through the same,

Fig. 3 is a perspective of a piston embodied in the invention,

Fig. 4 is a transverse section through the sectional rim and a solid tire,

Fig. 5 is a plan view of several of the rim sections,

Fig. 6 is a longitudinal section through the structure shown in Fig. 5, showing the tire in elevation, Fig. 7 is a perspective of one of the rim sections, and Fig. 8 is a fragmentary perspective of the tire.

In the drawings, wherein for the purpose of illustration is shown the preferred embodiment of my invention, the spaced circular plates 2 form the hub of my improved wheel and are provided with alining openings 3 for the reception of an axle. A plurality of radially disposed spokes 5 are secured to the hub plates 2 by transverse bolts 4. Nuts 6 have threaded engagement with the bolts 4, and are adapted to be removed therefrom for the purpose of removing any of the spokes.

As clearly shown in Fig. 2, the spokes 5 are provided with cylindrical reduced extensions 7, forming annular shoulders 8. Axially disposed cylindrical openings 9 are provided in the reduced extensions 7. The inner ends of cylinders 10 are arranged over the reduced extensions 7 of the spokes and are provided with cross heads 11 intermediate their ends. The cross heads 11 are provided with openings 12 alining with the cylindrical openings 9 in the extensions 7. The outer end portions of the cylinders 10 are provided with exterior screw threads 12′, engaging the interior screw threads 13 of an annular flange 14 formed integral with a cap 15. An opening 16 is provided in the cap 15. A piston rod 17 is arranged in each of the cylinders 10 and has threaded engagement with a piston 18. A coil spring 17′ is arranged on the piston rod 17 and serves to normally press the piston 18 outwardly. A shank portion 19 extends outwardly from the piston 18, and carries a transverse cylindrical barrel 20 having an opening 21 extending therethrough. Pivot elements or pins 22 extend through the openings 21 and carry bushings 23 on opposite sides of the barrel 20.

A rim 25 is arranged about the spokes and comprises a plurality of sections 26 (see Fig. 7). Each section 26 comprises a pair of longitudinally curved side bars 27, having a body plate 28 arranged therebetween, which has its opposite ends rounded, as at 29. Each of the longitudinally curved side bars 27 has one end portion thereof offset laterally to receive the straight end portion of the adjacent set of side bars 27. As clearly shown in Fig. 5, the elongated slots 31 in each of the bars 27 are adapted to aline with the elongated slots 31 in the adjacent side bars 27, and receive the pins 22. Thus the spokes are of telescoping construction being yieldingly held in their extended condition by the springs 17', and the rim 25 is adapted to flex in accordance with the yielding of the spokes which are arranged in supporting relation to the load, the necessary endwise movement of the links or members of the rim being afforded by the connections between the extremities of said members represented by the pins 22 and the slots 31.

As clearly shown in Fig. 6, the end portions of the body plates 28 are provided in their outer surfaces with recesses 32, receiving the terminals of wear plates 33 riveted, or otherwise secured in one of the recesses. Each wear plate extends over the adjacent barrel 20 and the bushings 23 and extends into the adjacent recess of the adjoining body portion 28.

A solid tire 35 is adapted to be arranged on the rim 25, and is provided on its inner surface with a plurality of spaced annular grooves 36. The opposite sides of the tire are provided along their inner edges with circumferential rabbets 37, adapted to receive the outer edges of the side bars 27.

The indicated construction of wheel provides for the progressive inward deflection of the rim subject to and under the control of the yielding resistance offered by the springs housed in the telescoping spokes with a freedom of rocking movement of the rim members with reference to the spokes and a relative longitudinal movement of the rim members, the rocking connections of the outer ends of the spokes with the rim being in the plane of the latter, and the protection of the tire being afforded by the wear plates which span the joints between the rim members, while relative lateral displacement of the tire is prevented by the interlocking connection between the same and the rim, due to the rabbets in the former for the reception of the side bars 27 of the latter.

Having thus described my invention, what I claim is:

1. A wheel having spokes, rim sections, side bars for said sections, means pivoting said side bars together, wear plates disposed intermediate the side bars and crossing said means and overlapping said sections, the outer faces of the wear plates being substantially flush with the outer faces of said sections, and said side bars projecting outwardly beyond the said sections and wear plates to mount a tire.

2. In a wheel, a spoke, a cylinder having a partition therein intermediate its ends, said spoke extending into one end of the cylinder abutting said partition, said partition and spoke having alining openings, a rod disposed on the opposite side of the partition to the spoke and slidable in said openings, a head on the rod, a cap supporting said head mounted on the adjacent end of the cylinder, an expansive spring in the cylinder abutting the partition and the cap, and means extending movably through the cap and from the head adapted to support a tire.

In testimony whereof I affix my signature in presence of two witnesses.

CONRAD RITZEL.

Witnesses:
MINNIE M. LANG,
CHARLES W. LANG.